(12) United States Patent
Cis et al.

(10) Patent No.: US 10,837,587 B2
(45) Date of Patent: Nov. 17, 2020

(54) HYDRAULIC PLUGS

(71) Applicant: Hamilton Sundstrand Corporation, Charlotte, NC (US)

(72) Inventors: Marcin Cis, Lutynia (PL); Dariusz Kiełbowicz, Boleslawiec (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 46 days.

(21) Appl. No.: 16/173,394

(22) Filed: Oct. 29, 2018

(65) Prior Publication Data
US 2019/0128465 A1    May 2, 2019

(30) Foreign Application Priority Data

Oct. 28, 2017 (EP) ..................... 17461628

(51) Int. Cl.
*F16L 55/13* (2006.01)
(52) U.S. Cl.
CPC .................... *F16L 55/13* (2013.01)
(58) Field of Classification Search
CPC . B65D 39/12; B65D 59/02; F16J 13/02; F16J 13/12; F16L 55/13; F16L 55/136; F16B 13/065
USPC ..... 138/89, 90; 220/233–235, 237; 29/522.1
See application file for complete search history.

(56) References Cited

U.S. PATENT DOCUMENTS

| | | | | |
|---|---|---|---|---|
| 3,525,365 A | * | 8/1970 | Boyle | F16J 13/12 138/89 |
| 3,825,146 A | * | 7/1974 | Hirmann | B65D 39/12 220/234 |
| 4,751,944 A | * | 6/1988 | Sinha | B25B 27/02 138/89 |
| 4,865,080 A | | 9/1989 | Lundquist | |
| 5,078,294 A | * | 1/1992 | Staubli | F16B 13/065 220/233 |
| 5,160,226 A | | 11/1992 | Lee, II | |
| 6,003,557 A | | 12/1999 | Brelig et al. | |
| 6,966,342 B2 | * | 11/2005 | Denham | F16L 55/13 138/89 |
| 2003/0178793 A1 | | 9/2003 | Denham | |
| 2015/0202754 A1 | | 7/2015 | Kirilichin et al. | |

(Continued)

OTHER PUBLICATIONS

Extended European Search Report for International Application No. 17461628.4 dated Apr. 23, 2018, 5 pages.

*Primary Examiner* — Patrick F Brinson
(74) *Attorney, Agent, or Firm* — Cantor Colburn LLP

(57) ABSTRACT

A plug for sealing a passage extending about a longitudinal axis (A) comprises a shell having a circumferential wall extending between an end wall and an opening, and an internal cavity extending axially within the shell, and an expander having a head and a shank extending axially from the head, the head retained with the cavity and the shank extending axially through the opening of the cavity, wherein the circumferential wall comprises an inner surface having at least a first region and a second region, the second region proximate the opening and the first region adjacent to the second region and extending therefrom towards the end wall, the inner surface in the first region tapering inwardly relative to the longitudinal axis (A) to provide a first angled ramp, and the inner surface in the second region tapering further inwardly to provide a second angled ramp.

17 Claims, 2 Drawing Sheets

FIG. 1

(56) References Cited

U.S. PATENT DOCUMENTS

2016/0069370 A1* 3/2016 Jiang .................. F16B 19/1054
                                                        411/510
2018/0112811 A1* 4/2018 Cis ......................... B65D 39/12
2018/0238482 A1* 8/2018 Cis ........................... F16J 13/14

* cited by examiner

HYDRAULIC PLUGS

FOREIGN PRIORITY

This application claims priority to European Patent Application No. 17461628.4 filed Oct. 28, 2017, the entire contents of which is incorporated herein by reference.

TECHNICAL FIELD

The present disclosure relates to a hydraulic plug and a method of sealing a passage with a hydraulic plug.

BACKGROUND

In many hydraulic devices, drilled galleries have to be sealed with plugs. In one known example, a tapered hole is reamed in a passage to precise dimensions and a tapered plug is pushed in to seal the passage. The plug can comprise two parts, namely a shell which seals against the internal surface of the passage and an expander (often referred to as a "pin") which is driven into the shell by a driver tool. The expander acts as a wedge to expand the shell within the passage to seal it off.

In this first known arrangement, the shell comprises a circumferential wall of uniform thickness that has a tapered surface, both externally and internally, and a sealed end. The reamed taper of the passage, the taper of the outer surface of the shell, the taper of the inner surface of the shell and the taper of the circumferential surface of the expander are substantially the same. In this way, when the expander is driven into the shell, the tapered outer surface of the shell seals against the reamed taper of the passage and the expander becomes wedged within the tapered cavity of the shell.

Such hydraulic plugs are described in U.S. Pat. No. 5,160,226 and are available from The Lee Company (see http://www.leeimh.com/metal/betaplug-expansion-plugs/betaplug-expansion-plug-SBP.htm for details).

In another known example, a hole of constant diameter is reamed in a passage. The transition between the reamed diameter and the passage diameter provides a step that a plug can be pushed up against during installation. As with the previous example, the hydraulic plug comprises a shell with an internal expander or pin. With the shell in place within the reamed part of the passage pushed up against the step, the expander can be driven into the shell's cavity to wedge the hydraulic plug in place, sealing it against the internal surface of the passage.

Hydraulic plugs of this type are also available from The Lee Company (see http://leecat.theleeco.com/ecatalog/lee-plugs/en for details).

Other hydraulic plug arrangements are described in U.S. Pat. Nos. 3,825,146, 6,003,557 and US-A-2015/0202754.

It is also known from U.S. Pat. No. 3,525,365 to provide a hydraulic plug in the form of a pre-assembled cylindrical shell with a tapered bore and a frusto-conical expander. The shell can be held while the expander is pulled via a stem against a constriction in the shell. The stem comprises a weakened region which is configured to break when a predetermined force is applied to the stem. In one configuration, an open end of the shell and a base of the expander face the pressure-side within the passage; in another, the shell is turned around relative to the frusto-conical surface of the expander so as to present a sealed end of the shell towards the pressure-side of the passage. In both cases, the tapered internal surface of the bore and the counter tapered surface of the expander match so that the expander becomes wedged along its entire length within the shell to secure the hydraulic plug within the passage.

However, housings are usually made of hard and brittle metal which requires very precise interference fit between the plug and housing in order to seal the opening securely while not causing the housing to crack. Current plug designs offer little control over the amount of interference pressure and final resting location of the expander after the shank breaks. These parameters are an effect of friction and dimensional tolerances of particular parts and can vary widely.

SUMMARY

According to one embodiment of the present disclosure, there is provided a plug for sealing a passage extending about a longitudinal axis, the plug comprising a shell having a circumferential wall extending between an end wall and an opening, and an internal cavity extending axially within the shell, and an expander having a head and a shank extending axially from the head, the head retained with the cavity and the shank extending axially through the opening of the cavity, wherein the circumferential wall comprises an inner surface having at least a first region and a second region, the second region proximate the opening and the first region adjacent to the second region and extending therefrom towards the end wall, the inner surface in the first region tapering inwardly relative to the longitudinal axis to provide a first angled ramp, and the inner surface in the second region tapering further inwardly to provide a second angled ramp, the expander being operable to urge the circumferential wall of the shell outwardly as it moves along the inner surface in the first region.

The inner surface may define a third region adjacent to the first region. The inner surface in the third region may extend relative to the longitudinal axis at an angle less than the taper angle of the first angled ramp.

The inner surface in the third region may extend substantially parallel to the longitudinal axis.

The inner surface in the third region may extend to the end wall of the shell.

The first angled ramp may be tapered inwardly relative to the longitudinal axis at an angle between 1 and 7 degrees, or between 2 and 6 degrees, or between 3 and 5 degrees.

The shank may comprise a weakened region proximate the head.

The head may be formed of a harder material than the shell.

The shell may comprise stainless steel, an aluminium alloy, a copper alloy, a titanium alloy or a plastic.

The expander may comprise stainless steel, an aluminium alloy, a copper alloy, a titanium alloy or a plastic.

The plug may further comprise a tool having a central part and an outer part. The central part may be configured to apply a tensile force to the shank and the outer part may be configured to maintain the axial position of the shell.

The circumferential wall may comprise a substantially cylindrical outer surface having a diameter substantially corresponding to an internal diameter of the passage.

The head may be a sphere or part of a sphere, for example a hemisphere or a spherical cap.

An inner diameter of the circumferential wall proximate the end wall of the shell may substantially correspond to an outer diameter of the head of the expander.

According to another embodiment of the present disclosure, there is provided a method of sealing a passage with any of the above hydraulic plugs, comprising inserting the hydraulic plug into the passage, and applying a tensile force to the shank to pull the head in an axial direction towards the opening, wherein the axial movement of the head is partially inhibited by the first angled ramp such that the circumferential wall is urged against an inner wall of the passage as the head moves along the axial direction to gradually increase an interference fit pressure between the shell and the inner wall of the passage, and the axial movement of the head is substantially completely inhibited by the second angled ramp such that the shank breaks away from the head once the tensile force reaches a breaking load of the expander.

The axial movement of the head may not be inhibited by the inner surface of the circumferential wall in a or the third region adjacent to the first region.

The axial movement of the head through the first region may cause a or the outer diameter of the circumferential wall to expand radially.

The head of the expander may remain in the shell to seal the plug within the passage.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
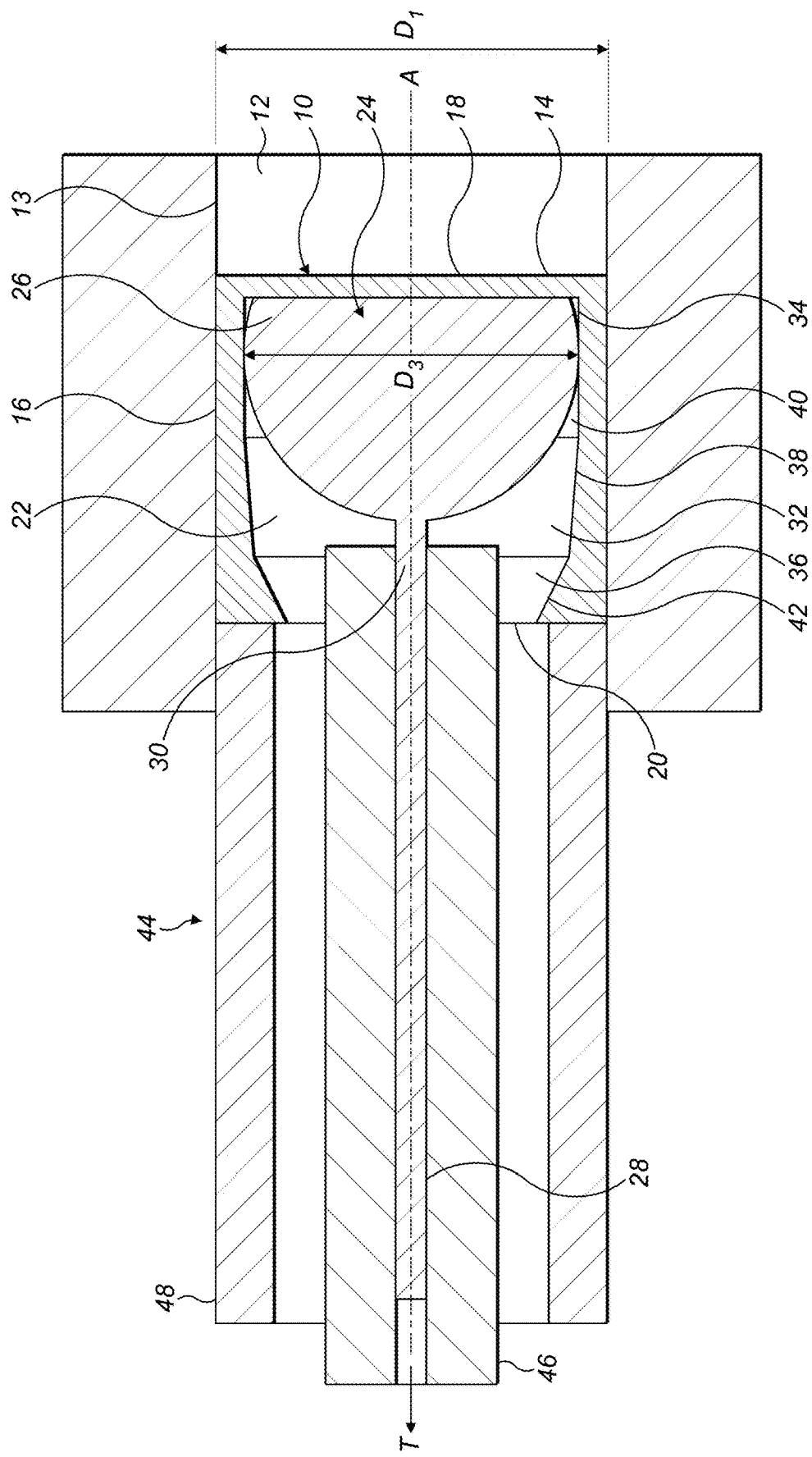
FIG. 1 shows a cross-section of a hydraulic plug in accordance with an embodiment of the present invention.

FIG. 1 illustrates a cross-section of a hydraulic plug 10 within a passage 12 of a hydraulic gallery having an inner wall 13 with an inner diameter $D_1$ extending about a longitudinal axis A. The hydraulic plug 10 comprises a shell 14 which has a circumferential wall 16, a sealed end provided by an end wall 18, an open end provided by opening 20 and a cavity 22 opening to the open end. The cavity 22 extends axially within the shell 14. An outer surface of the circumferential wall 16 may be cylindrical and have a uniform diameter $D_2$ substantially corresponding to the inner diameter $D_1$ of the passage 12.

The hydraulic plug 10 also comprises an expander 24 having a head 26, which may be for example a sphere or part of a sphere (e.g., a hemisphere or a spherical cap) having a diameter $D_3$, and an elongate shank 28 extending from and connected to the head 24. The shank 28 extends out of the opening 20 of the shell 14 in an axial direction. The expander 24 may comprise a weakened region 30 where the shank 28 joins to the head 26, in order to promote fracturing in this region when a predetermined tensile force T is applied to the shank 28.

The circumferential wall 16 comprises an inner surface 34 having at least a first region 32 and a second region 36. The second region 36 of the inner surface 34 is proximate the opening 20, and the first region 32 of the inner surface 34 is adjacent to and extends from the second region 36 towards the end wall 18. The second region 36 may, as shown, extend to the opening 20 or may terminate a distance therefrom. The inner surface 34 of the circumferential wall 16 in the first region 32 tapers inwardly relative to the longitudinal axis A to form a first angled ramp 38. The first angled ramp 38 is configured to gradually tension the head 26 of the expander 24. The inner surface 34 of the circumferential wall 16 in the second region 36 tapers inwardly relative to the inner surface 34 of the circumferential wall 16 in the first region 32 to form a second angled ramp 42. The second angled ramp 42 is configured as a stop for the head 26 of the expander 24.

In one embodiment, the first region 32 of the inner surface 34 may extend to the end wall 18 of the shell 14.

Figure 2:
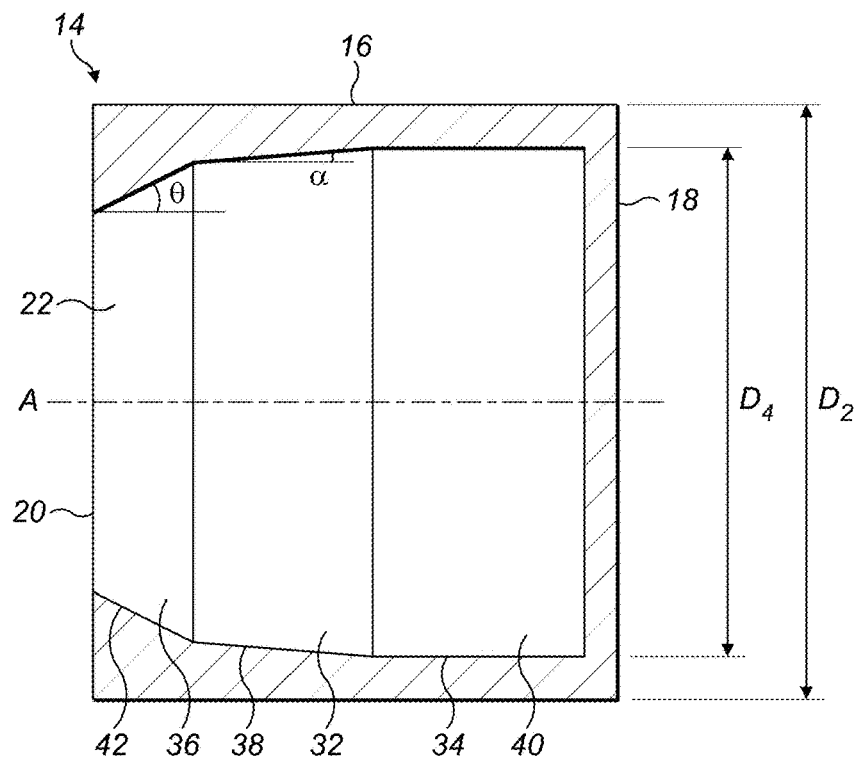
FIG. 2 shows a cross-section of the shell of FIG. 1.

In another embodiment, the inner surface 34 of the circumferential wall 16 may define a third region 40 adjacent to and extending from the first region 32 of the inner surface 34. The third region 40 of the inner surface 34 may extend to the end wall 18 of the shell 14. In an embodiment, as shown in FIG. 2, the circumferential wall 16 in the third region 40 may have a substantially constant inner diameter $D_4$ along its length such that the inner surface 34 in the third region 40 extends substantially parallel to the longitudinal axis A. The inner diameter $D_4$ may substantially correspond to the diameter $D_3$ of the head 26 of the expander 24. In another embodiment, the inner surface 34 in the third region 40 may taper inwardly relative to the longitudinal axis A, provided it does not interfere with the head 26 of the expander 24.

The angle at which the inner surface 34 tapers inwardly relative to the longitudinal axis A increases in each region in the direction from the end wall 18 to the opening 20. Thus the first region 32 has a lesser taper than the second region 34.

An angle α at which the inner surface 34 of the circumferential wall 16 in the first region 32 extends relative to the longitudinal axis A may be, for example, between 1 and 7 degrees, or between 2 and 6 degrees, or between 3 and 5 degrees.

The inner surface 34 of the circumferential wall 16 in the second region 36 extends relative to the longitudinal axis A at an angle θ that is greater than the angle α at which the inner surface 34 in the first region 32 extends relative to the longitudinal axis A. The angle θ may be less than or equal to 90 degrees, or less than or equal to 60 degrees, or less than or equal to 30 degrees.

The shell 14 and the expander 24 may comprise any material suitable for mechanical seals in hydraulic devices, the choice of which may depend on the material of the device that it is being installed in (e.g., for compatibility). Metals like stainless steels, aluminium alloys, copper alloys, titanium alloys, etc., may be chosen accordingly. The chosen metal should also offer suitable corrosion resistance and ductility during forming.

By way of example only, exemplary alloys for the shell 14 could be ductile stainless steels like AISI 300 series or 416. The expander may comprise a harder stainless steel like A304 or A286. The present disclosure is not in any way limited to these materials. In other examples, plastics may be used for the shell 14 and/or the expander 24.

To install the hydraulic plug 10, the hydraulic plug 10 is inserted within a passage 12 of substantially the same diameter as shown in FIG. 1. Once in place, a tensile force T is applied to the shank 28 to draw the head 26 of the expander 24 in an axial direction towards the opening 20.

An expander tool 44 may be used to apply the tensile force T. A central part 46 of the tool 44 may apply the tensile force T to the shank 28 of the expander 24, and a fixed outer part 48 of the tool 46 may abut the shell 14 to maintain its axial position relative to the expander 24. The shank 28 may be provided with grooves, ridges or another form of relief (not shown) to aid gripping by the tool 44. The shank 28 may comprise a rod or wire of metal.

Figure 3:
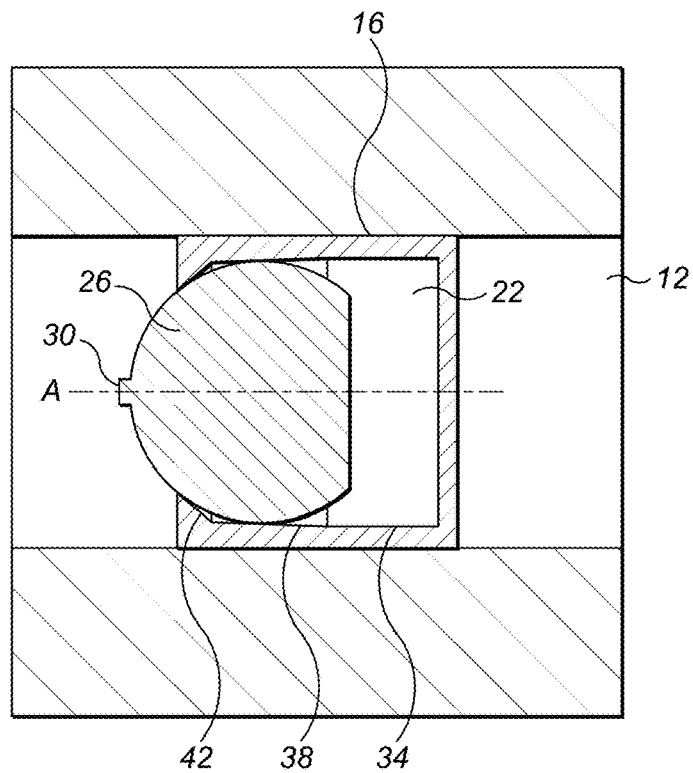
FIG. 3 shows a cross-section of a passage sealed by the hydraulic plug of FIG. 1.

As the tensile force T draws the head 26 of the expander 24 in the axial direction, the head 26 of the expander 24 passes through the first region 32 and the tensile force T urges the head 26 against the first angled ramp 38, which allows for gradual and smooth tensioning of the expander 24 as it moves in the axial direction and urges the circumferential wall 16 outwardly into sealing engagement with the inner wall 13 of the passage 12. Once the head 26 of the expander 24 reaches the end of the first region 32, the head 26 contacts the second angled ramp 42 of the second region 36 which substantially stops the head 26 from travelling any further in the axial direction. The tensile force T then continues to urge the head 26 against the second angled ramp 42 until a breaking tensile load of the expander 24 is reached, at which point the shank 28 breaks away from the head 26 and leaves the plug 10 sealed within the passage 12, as shown in FIG. 3. The head 26 of the expander 24 remains trapped within the shell 14 during use of the hydraulic device.

In one embodiment, as the tensile force T begins to draw the head 26 of the expander 24 in the axial direction, the head 26 of the expander 24 is urged against the first angled ramp 38 substantially immediately. In another embodiment, the inner surface 34 comprises the third region 40 such that the movement of the head 26 of the expander 24 is initially uninhibited by the inner surface 34 as the head 26 of the expander 24 is pulled in the axial direction until it contacts the first angled ramp 38.

This configuration is advantageous in that allows the shank 28 to always break in a predictable manner, resulting in a consistent interference fit pressure and with the head 26 always resting at the same axial position within the plug.

The plug 10 may allow for more accurate control of increases in the diameter $D_2$ of the outer surface of the circumferential wall 16. The diameter $D_2$ of the outer surface of the circumferential wall 16 may be configured to increase a selected amount, if it were not constrained by the inner wall 13 of the passage 12, in response to the head 26 moving axially relative to the shell 14 through the first region 32.

The diameters of the passage $D_1$, the outer surface of the circumferential wall $D_2$, the head of the expander $D_3$ and/or the inner surface $D_4$ may each be selected to control an amount that the outer surface of the circumferential wall 16 in the first region 32 increases as a result of the head 26 moving axially through the first region 32.

An increasing thickness of the circumferential wall 16 in the second region 36 in the axial direction, defined by the second angled ramp 42, may increase the force needed to radially expand the shell 14 in the second region 36 sufficiently to prevent any additional increase in the diameter $D_2$ of the outer surface of the circumferential wall 16 beyond that which occurs as the head 26 passes through the first region 32.

Although the figures and the accompanying description describe particular embodiments and examples, it is to be understood that the scope of this disclosure is not to be limited to such specific embodiments, and is, instead, to be determined by the following claims.

The invention claimed is:

1. A plug for sealing a passage extending about a longitudinal axis (A), the plug comprising:
a shell having a circumferential wall extending between an end wall and an opening, and an internal cavity extending axially within the shell; and
an expander having a head and a shank extending axially from the head, the head retained with the cavity and the shank extending axially through the opening of the cavity, wherein the circumferential wall comprises an inner surface having at least a first region and a second region, the second region proximate the opening and the first region adjacent to the second region and extending therefrom towards the end wall, the inner surface in the first region tapering inwardly relative to the longitudinal axis (A) to provide a first angled ramp, and the inner surface in the second region tapering further inwardly relative to the longitudinal axis (A) at an angle θ that is greater than an angle α at which the inner surface in the first region extends relative to the longitudinal axis (A) to provide a second angled ramp, the expander being operable to urge the circumferential wall of the shell outwardly as it moves along the inner surface in the first region.

2. The plug as recited in claim 1, wherein the inner surface defines a third region adjacent to the first region, the inner surface in the third region extending relative to the longitudinal axis (A) at an angle less than the taper angle of the first angled ramp.

3. The plug as recited in claim 2, wherein the inner surface in the third region extends substantially parallel to the longitudinal axis (A).

4. The plug as recited in claim 2, wherein the inner surface in the third region extends to the end wall of the shell.

5. The plug as recited in claim 1, wherein the first angled ramp is tapered inwardly relative to the longitudinal axis (A) at an angle (α) between 1 and 7 degrees.

6. The plug as recited in claim 1, wherein the shank comprises a weakened region proximate the head.

7. The plug as recited in claim 1, wherein the head is formed of a harder material than the shell.

8. The plug as recited in claim 1, wherein the shell or the expander comprises stainless steel, an aluminium alloy, a copper alloy, a titanium alloy or a plastic.

9. A plug for sealing a passage extending about a longitudinal axis (A), the plug comprising:
a shell having a circumferential wall extending between an end wall and an opening, and an internal cavity extending axially within the shell;
an expander having a head and a shank extending axially from the head, the head retained with the cavity and the shank extending axially through the opening of the cavity, wherein the circumferential wall comprises an inner surface having at least a first region and a second region, the second region proximate the opening and the first region adjacent to the second region and extending therefrom towards the end wall, the inner surface in the first region tapering inwardly relative to the longitudinal axis (A) to provide a first angled ramp, and the inner surface in the second region tapering further inwardly to provide a second angled ramp, the expander being operable to urge the circumferential wall of the shell outwardly as it moves along the inner surface in the first region; and
a tool having a central part and an outer part, the central part configured to apply a tensile force (T) to the shank and the outer part configured to maintain the axial position of the shell.

10. The plug as recited claim 1, wherein the circumferential wall comprises a substantially cylindrical outer surface having a diameter ($D_2$) substantially corresponding to an inner diameter ($D_1$) of the passage.

11. The plug as recited in claim 1, wherein the head is a sphere or part of a sphere.

12. The plug as recited in claim 11, wherein an inner diameter ($D_4$) of the circumferential wall proximate the end wall of the shell substantially corresponds to an outer diameter ($D_3$) of the head of the expander.

13. A method of sealing a passage with the hydraulic plug of claim 1, comprising:
   inserting the hydraulic plug into the passage; and
   applying a tensile force (T) to the shank to pull the head in an axial direction towards the opening, wherein the axial movement of the head is partially inhibited by the first angled ramp such that the circumferential wall is urged against an inner wall as the head moves along the axial direction to gradually increase an interference fit pressure between the shell and the inner wall of the passage, and the axial movement of the head is substantially completely inhibited by the second angled ramp such that the shank breaks away from the head once the tensile force (T) reaches a breaking load of the expander.

14. The method of claim 13, wherein the axial movement of the head is not inhibited by the inner surface of the circumferential wall in a third region adjacent to the first region.

15. The method of claim 14, wherein the head of the expander remains in the shell to seal the plug within the passage.

16. The plug as recited in claim 1, wherein the angle (a) is between 2 and 6 degrees.

17. The plug as recited in claim 1, wherein the angle (a) is between 3 and 5 degrees.

* * * * *